United States Patent
Takii et al.

(10) Patent No.: US 10,933,802 B2
(45) Date of Patent: Mar. 2, 2021

(54) VEHICLE ILLUMINATION SYSTEM AND VEHICLE

(71) Applicant: KOITO MANUFACTURING CO., LTD., Tokyo (JP)

(72) Inventors: Naoki Takii, Shizuoka (JP); Atsushi Sugimoto, Shizuoka (JP); Misako Kamiya, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 83 days.

(21) Appl. No.: 16/270,378

(22) Filed: Feb. 7, 2019

(65) Prior Publication Data
US 2019/0248279 A1 Aug. 15, 2019

(30) Foreign Application Priority Data

Feb. 9, 2018 (JP) .............................. JP2018-021920

(51) Int. Cl.
| | |
|---|---|
| *B60Q 1/50* | (2006.01) |
| *G05D 1/00* | (2006.01) |
| *G06K 9/00* | (2006.01) |
| *G05D 1/02* | (2020.01) |

(52) U.S. Cl.
CPC .............. *B60Q 1/50* (2013.01); *G05D 1/0088* (2013.01); *G05D 1/0246* (2013.01); *G05D 2201/0213* (2013.01); *G06K 9/00791* (2013.01)

(58) Field of Classification Search
CPC ........ B60Q 1/50; B60Q 1/0041; B60Q 1/503; B60Q 2400/20; B60Q 2300/45; G05D 1/0088; G05D 1/0246; G05D 2201/0213; G06K 9/00791
See application file for complete search history.

(56) References Cited

U.S. PATENT DOCUMENTS

| | | | |
|---|---|---|---|
| 2013/0188374 A1* | 7/2013 | Schneider | .............. B60Q 1/143 362/465 |
| 2018/0215312 A1 | 8/2018 | Salter et al. | |
| 2019/0041864 A1 | 2/2019 | Konishi et al. | |

FOREIGN PATENT DOCUMENTS

| | | |
|---|---|---|
| JP | H09-277887 A | 10/1997 |
| JP | 2019-032806 A | 2/2019 |

OTHER PUBLICATIONS

Office Action issued in French Application No. 1901229, dated Nov. 5, 2020 (9 pages).

* cited by examiner

*Primary Examiner* — Peter D Nolan
*Assistant Examiner* — Ashley L Redhead, Jr.
(74) *Attorney, Agent, or Firm* — Osha Bergman Watanabe & Burton LLP

(57) ABSTRACT

A vehicle illumination system provided to a vehicle capable of traveling in an autonomous driving mode includes: an illumination unit configured to emit light toward an outside of the vehicle; and an illumination controller configured to change an illumination mode of the illumination unit, depending on a waiting time of the vehicle.

6 Claims, 7 Drawing Sheets

VEHICLE ILLUMINATION SYSTEM AND VEHICLE

CROSS-REFERENCE TO RELATED APPLICATION

This application is based on and claims priority under 35 USC 119 from Japanese Patent Application No. 2018-021920 filed on Feb. 9, 2018, the contents of which are incorporated herein by reference.

TECHNICAL FIELD

The present disclosure relates to a vehicle illumination system. In particular, the present disclosure relates to a vehicle illumination system provided in a vehicle capable of driving in an autonomous driving mode. Also, the present disclosure relates to a vehicle including the vehicle illumination system.

BACKGROUND

Currently, research on an autonomous driving technology of an automobile has been actively conducted in countries, and the countries are considering the legislation so as to enable a vehicle (hereinafter, a "vehicle" refer to an automobile) to travel in an autonomous driving mode on public roads. Here, in the autonomous driving mode, a vehicle system autonomously controls traveling of a vehicle. Specifically, in the autonomous driving mode, the vehicle system autonomously performs at least one of a steering control (control of a traveling direction of the vehicle), a brake control and an accelerator control (control of braking and acceleration/deceleration of the vehicle) based on information (surrounding environment information) indicative of a surrounding environment of the vehicle and obtained from sensors such as a camera, a radar (for example, a laser radar or a millimeter wave radar) and the like. On the other hand, in a manual driving mode to be described later, a driver controls the traveling of the vehicle, as in most of conventional vehicles. Specifically, in the manual driving mode, the traveling of the vehicle is controlled in conformity with a driver's operation (a steering operation, a braking operation, and an accelerator operation), and the vehicle system does not autonomously perform the steering control, the brake control and the accelerator control. The driving mode of the vehicle is not a concept existing only in some vehicles but a concept existing in all vehicles including conventional vehicles having no autonomous driving function. For example, the driving mode of the vehicle is classified in accordance with a vehicle control method or the like.

Thus, in the future, it is expected that vehicles traveling in the autonomous driving mode (hereinafter, appropriately referred to as "autonomous driving vehicle") and vehicles traveling in the manual driving mode (hereinafter, appropriately referred to as "manual driving vehicle") coexist on public roads.

As an example of the autonomous driving technology, Patent Document 1 (Japanese Patent Application Laid-Open Publication No. H09-277887) discloses an autonomous follow-up traveling system in which a following vehicle can autonomously follow a preceding vehicle. In the autonomous follow-up traveling system, each of the preceding vehicle and the following vehicle has an illumination system, character information for preventing another vehicle from intruding between the preceding vehicle and the following vehicle is displayed on the illumination system of the preceding vehicle. And character information indicative of the autonomous follow-up traveling mode is displayed on the illumination system of the following vehicle.

In an autonomous driving society where the autonomous driving vehicles travel everywhere on the roads, it is expected that visual communication between a vehicle and the other vehicle outside the vehicle will be more important.

In particular, it is thought that visual inter-vehicle communication is more important at a merging point and the like. When the visual inter-vehicle communication is not sufficient, a vehicle traveling on a merging traffic lane may not smoothly move to a main traffic lane. Like this, there is room for further consideration of the visual inter-vehicle communication.

The present disclosure is aimed at providing a vehicle illumination system and a vehicle capable of implementing rich visual communication between vehicles.

SUMMARY

A vehicle illumination system related to one aspect of the present disclosure and provided to a vehicle capable of traveling in an autonomous driving mode includes: an illumination unit configured to emit light toward an outside of the vehicle; and an illumination controller configured to change an illumination mode of the illumination unit, depending on a waiting time of the vehicle.

According to the above configuration, it becomes possible to provide a vehicle illumination system and a vehicle capable of implementing rich visual communication between vehicles

BRIEF DESCRIPTION OF DRAWINGS

Exemplary embodiments of the present invention will be described in detail based on the following figures, wherein.

DETAILED DESCRIPTION

Figure 1:
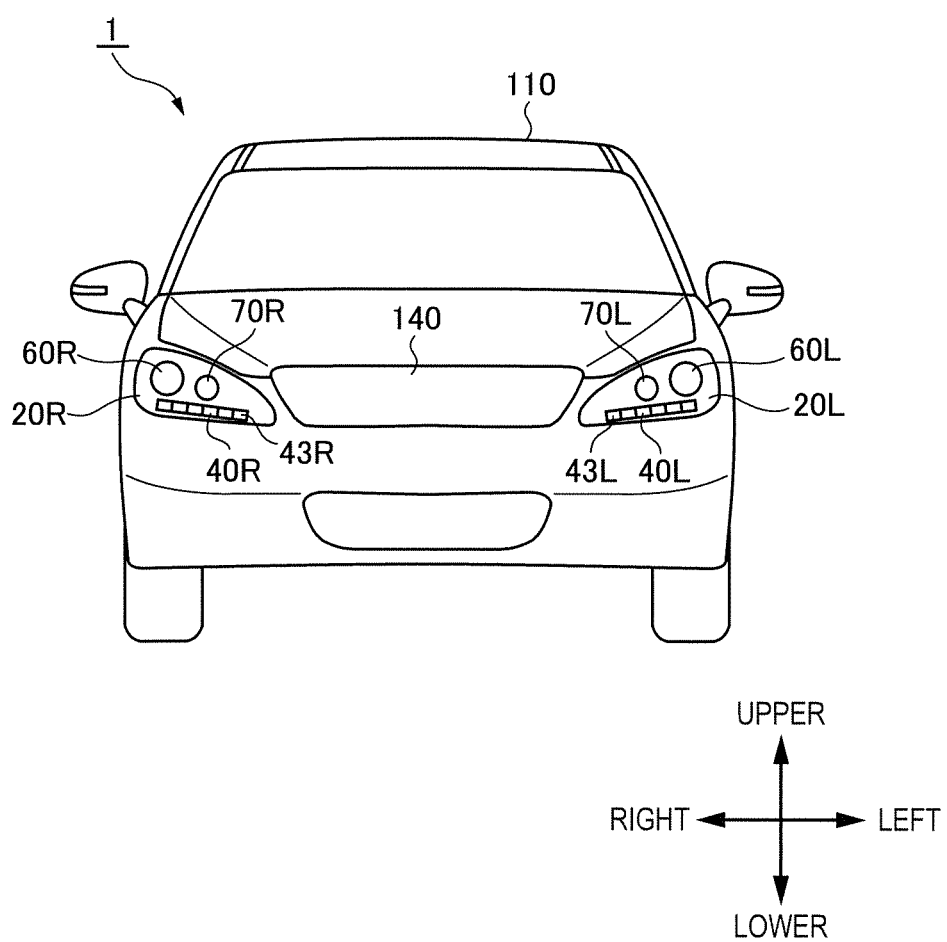
FIG. 1 is a front view of a vehicle having a vehicle illumination system in accordance with an illustrative embodiment of the present disclosure (hereinafter, simply referred to as 'illustrative embodiment')

Hereinafter, an illustrative embodiment of the present disclosure (hereinafter, referred to as 'illustrative embodiment') will be described with reference to the drawings. For the sake of convenience of description, dimensions of the respective members shown in the drawings may be different from actual dimensions of the respective members.

Also, in the description of the illustrative embodiment, for the sake of convenience of description, "the right and left direction", "the upper and lower direction" and "the front and rear direction" will be appropriately mentioned. The directions are relative directions set with respect to a vehicle 1 shown in FIG. 1. Here, "the right and left direction" is a direction including "the rightward direction" and "the leftward direction". "The upper and lower direction" is a direction including "the upward direction" and "the downward direction". "The front and rear direction" is a direction including "the forward direction" and "the rearward direction". Although not shown in FIG. 1, the front and rear direction is a direction perpendicular to the right and left direction and the upper and lower direction.

Figure 2:
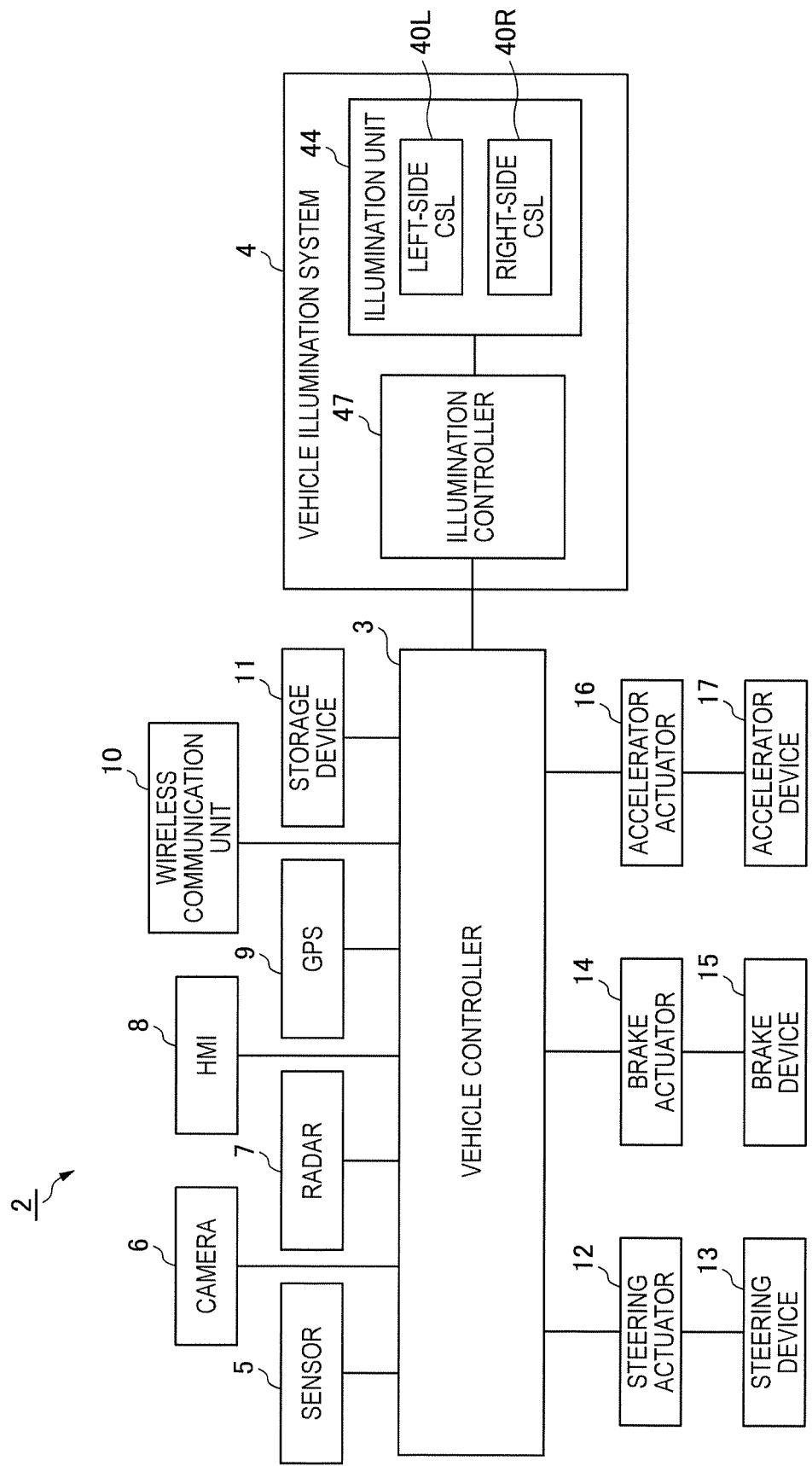
FIG. 2 is a block diagram depicting a vehicle system having the vehicle illumination system of the illustrative embodiment.

First, a vehicle illumination system 4 (hereinafter, simply referred to as "the illumination system 4") of the illustrative embodiment is described with reference to FIGS. 1 and 2. FIG. 1 is a front view of the vehicle 1 having the illumination system 4 mounted thereto. FIG. 2 is a block diagram depicting a vehicle system 2 having the illumination system 4. The vehicle 1 is a vehicle (automobile) capable of traveling in an autonomous driving mode, and includes the vehicle system 2.

As shown in FIGS. 1 and 2, the illumination system 4 includes an illumination unit 44 and an illumination controller 47. The illumination unit 44 is a lamp for supporting visual communication between a target object such as a pedestrian, other vehicle and the like and the vehicle 1, and is configured to visually present a message toward an outside of the vehicle 1. The illumination unit 44 includes a left-side communication support lamp 40L (hereinafter, simply referred to as 'left-side CSL 40L') and a right-side communication support lamp 40R (hereinafter, simply referred to as 'right-side CSL 40R').

The left-side CSL 40L is configured to emit light toward the outside of the vehicle 1, and is arranged in a lamp chamber of a left-side headlamp 20L mounted at a front left side of the vehicle 1. The lamp chamber of the left-side headlamp 20L is formed by a lamp housing (not shown) and a transparent cover (not shown) connected to the lamp housing. The left-side CSL 40L is arranged to extend in the right and left direction of the vehicle 1, and includes six light-emitting segments 43L. The six light-emitting segments 43L are arranged side by side in the right and left direction of the vehicle 1. Each of the light-emitting segments 43L includes a red LED (Light Emitting Diode) configured to emit red light, a green LED configured to emit green light and a blue LED configured to emit blue light. The left-side headlamp 20L includes a low beam lamp 60L configured to emit a low beam toward the front of the vehicle 1 and a high beam lamp 70L configured to emit a high beam toward the front of the vehicle 1.

The right-side CSL 40R is configured to emit light toward the outside of the vehicle 1, and is arranged in a lamp chamber of a right-side headlamp 20R mounted at a front right side of the vehicle 1. The lamp chamber of the right-side headlamp 20R is formed by a lamp housing (not shown) and a transparent cover (not shown) connected to the lamp housing. The right-side CSL 40R is arranged to extend in the right and left direction of the vehicle 1, and includes six light-emitting segments 43R. The six light-emitting segments 43R are arranged side by side in the right and left direction of the vehicle 1. Each of the light-emitting segments 43R includes a red LED, a green LED and a blue LED. The right-side headlamp 20R includes a low beam lamp 60R configured to emit a low beam toward the front of the vehicle 1 and a high beam lamp 70R configured to emit a high beam toward the front of the vehicle 1.

In the meantime, the arrangement places of the left-side CSL 40L and the right-side CSL 40R are not particularly limited. For example, the left-side CSL 40L may be arranged in the vicinity of the left-side headlamp 20L or may be arranged above a grill 140 of the vehicle 1. The right-side CSL 40R may be arranged in the vicinity of the right-side headlamp 20R or may be arranged above the grill 140. Also, in the illustrative embodiment, the left-side CSL 40L includes the six light-emitting segments 43L. However, the number of the light-emitting segments 43L is not particularly limited. Likewise, the right-side CSL 40R includes the six light-emitting segments 43R but the number of the light-emitting segments 43R is not particularly limited.

Also, in the illustrative embodiment, the illumination unit 44 is configured by the left-side CSL 40L and the right-side CSL 40R. However, the structure of the illumination unit 44 of the illustrative embodiment is not limited thereto. For example, the illumination unit 44 may include a plurality of light-emitting segments and may be configured to emit lights toward the outside of the vehicle 1 over an entire surrounding (360°) of the vehicle 1 in the horizontal direction. In this respect, the illumination unit 44 may be arranged to surround a vehicle body of the vehicle 1 or may be arranged on a vehicle body roof 110.

Subsequently, the vehicle system 2 of the vehicle 1 is described with reference to FIG. 2. FIG. 2 is a block diagram of the vehicle system 2. As shown in FIG. 2, the vehicle system 2 includes a vehicle controller 3, the illumination system 4, a sensor 5, a camera 6, a radar 7, an HMI (Human Machine Interface) 8, a GPS (Global Positioning System) 9, a wireless communication unit 10, and a storage device 11. In addition, the vehicle system 2 includes a steering actuator 12, a steering device 13, a brake actuator 14, a brake device 15, an accelerator actuator 16, and an accelerator device 17.

The vehicle controller 3 is configured to control traveling of the vehicle 1. The vehicle controller 3 is configured by, for example, at least one an electronic control unit (ECU). The electronic control unit includes a computer system (for example, SoC (System on a Chip) and the like) having one or more processors and one or more memories, and an electronic circuit having an active element such as a transistor and a passive element. The processor includes at least one of a CPU (Central Processing Unit), an MPU (Micro Processing Unit), a GPU (Graphics Processing Unit) and a TPU (Tensor Processing Unit), for example. The CPU may be configured by a plurality of CPU cores. The GPU may be configured by a plurality of GPU cores. The memory includes a ROM (Read Only Memory) and a RAM (Random Access Memory). In the ROM, a vehicle control program may be stored. For example, the vehicle control program may include an artificial intelligence (AI) program for autonomous driving. The AI program is a program established by a supervised or unsupervised machine learning (particularly, deep learning) using a multi-layered neural network. In the RAM, the vehicle control program, vehicle control data and/or surrounding environment information indicative of a surrounding environment of the vehicle may be temporarily stored. The processor may be configured to develop, on the RAM, a program designated from the diverse vehicle control programs stored in the ROM and to execute a variety of processes in cooperation with the RAM. Also, the computer system may be configured by a non-Neumann type computer such as an ASIC (Application Specific Integrated Circuit), an FPGA (Field-Programmable Gate Array) and the like. Also, the computer system may be configured by a combination of a Neumann type computer and a non-Neumann type computer.

As described above, the illumination system 4 includes the illumination unit 44 and the illumination controller 47. The illumination controller 47 is configured to control the illumination unit 44 (in particular, the left-side CSL 40L and the right-side CSL 40R). In particular, the illumination controller 47 is configured to change an illumination mode (for example, an illumination color, an illumination intensity, a blinking cycle, an illumination place and the like) of the left-side CSL 40L and the right-side CSL 40R. Also, the illumination controller 47 and/or the vehicle controller 3 may have a timer function for counting time.

The illumination controller 47 is configured by an electronic control unit (ECU) and is electrically connected to a power supply (not shown). The electronic control unit includes a computer system (for example, SoC and the like) having one or more processors and one or more memories, and an analog processing circuit having an active element such as a transistor and a passive element. The processor includes at least one of a CPU, an MPU, a GPU and a TPU, for example. The memory includes a ROM and a RAM. Also, the computer system may be configured by a non-Neumann type computer such as an ASIC, an FPGA and the like. The analog processing circuit includes a lamp drive circuit (for example, an LED driver and the like) configured to control drives of the left-side CSL 40L and the right-side CSL 40R.

For example, the illumination controller 47 is electrically connected to each LED of each of the light-emitting segments 43L, 43R. For example, when one of the six light-emitting segments 43L emits the red light, the illumination controller 47 supplies an electric signal (for example, PWM (Pulse Width Modulation) signal) to the red LED belonging to the one light-emitting segment 43L. Then, the red LED emits the red light, depending on the electric signal supplied from the illumination controller 47. In this way, the red light is emitted from the light-emitting segment 43L. Also, when all of the six light-emitting segments 43L emit the white light, the illumination controller 47 supplies the electric signal to the red LED, the green LED and the blue LED belonging to each of the light-emitting segments 43L. Then, the red light emitted from the red LED, the green light emitted from the green LED and the blue light emitted from the blue LED are composed to generate white light. In this way, the white light is emitted from all of the six light-emitting segments 43L. Also, the illumination controller 47 can emit lights of diverse colors from the respective light-emitting segments 43L by adjusting the electric signal to be supplied to each LED.

In this way, the illumination controller 47 can individually control lightings of the respective LEDs belonging to the respective light-emitting segments 43L (i.e., individually supply the electric signal to the respective LEDs), thereby changing an illumination state (for example, an illumination color, an illumination intensity, a blinking cycle, an illumination place and the like) of each of the light-emitting segments 43L.

The sensor 5 includes an acceleration sensor, a speed sensor, a gyro sensor, and the like. The sensor 5 is configured to detect a traveling condition of the vehicle 1 and to output traveling condition information to the vehicle controller 3. The sensor 5 may further include a seating sensor configured to detect whether a driver is sitting on a driver seat, a face direction sensor configured to detect a direction of a driver's face, an external weather sensor configured to detect an external weather condition, a passenger detection sensor configured to detect whether there is a passenger in a vehicle, and the like.

The camera 6 is, for example, a camera including an imaging device such as a CCD (Charge-Coupled Device) and a CMOS (complementary MOS). The camera 6 is configured to acquire image data indicative of a surrounding environment of the vehicle 1 and to transmit the image data to the vehicle controller 3. The vehicle controller 3 is configured to specify the surrounding environment information, based on the transmitted image data. Here, the surrounding environment information may include information about a target object (a pedestrian, the other vehicle, a marker and the like) existing at the outside of the vehicle 1. For example, the surrounding environment information may include information about attributes of the target object existing at the outside of the vehicle 1, and information about a distance and a position of the target object relative to the vehicle 1. The camera 6 may be configured as a monocular camera or a stereo camera.

The radar 7 is a millimeter wave radar, a microwave radar and/or a laser radar (for example, LiDAR). For example, the LiDAR unit is configured to detect the surrounding environment of the vehicle 1. In particular, the LiDAR unit is configured to acquire 3D mapping data (point group data) indicative of the surrounding environment of the vehicle 1 and to transmit the 3D mapping data to the vehicle controller 3. The vehicle controller 3 is configured to specify the surrounding environment information, based on the transmitted 3D mapping data.

The HMI 8 includes an input unit configured to receive an input operation from a driver and an output unit configured to output the traveling information and the like toward the driver. The input unit includes a steering wheel, an accelerator pedal, a brake pedal, a driving mode changeover switch for switching the driving mode of the vehicle 1, and the like. The output unit is a display configured to display a variety of traveling information. The GPS 9 is configured to acquire current position information of the vehicle 1 and to output the acquired current position information to the vehicle controller 3

The wireless communication unit 10 is configured to receive information (for example, traveling information, and the like) relating to other vehicles around the vehicle 1 from the other vehicles and to transmit information (for example, traveling information, and the like) relating to the vehicle 1 to the other vehicles (inter-vehicle communication). Also, the wireless communication unit 10 is configured to receive infrastructure information from the infrastructure equipment such as a traffic light, a marker lamp and the like and to transmit the traveling information of the vehicle 1 to the infrastructure equipment (road-to-vehicle communication). Also, the wireless communication unit 10 is configured to receive information relating to a pedestrian from a portable electronic device (a smart phone, a tablet, a wearable device, and the like) carried by the pedestrian and to transmit the host vehicle traveling information of the vehicle 1 to the portable electronic device (pedestrian-to-vehicle communication). The vehicle 1 may be configured to perform communication with the other vehicle, the infrastructure equipment or the portable electronic device by an ad hook mode directly or via an access point. Also, the vehicle 1 may be configured to perform communication with the other vehicle, the infrastructure equipment or the portable electronic device via a communication network (not shown) such as the Internet. The wireless communication standards include, for example, Wi-Fi (registered trademark), Bluetooth (registered trademark), ZigBee (registered trademark), LPWA, DSRC (registered trademark) or Li-Fi. Also, the vehicle 1 may be configured to perform communication with the other vehicle, the infrastructure equipment or the portable electronic device via a fifth generation (5G) mobile communication system.

The storage device 11 is an external storage device such as a hard disc drive (HDD), an SSD (Solid State Drive) and the like. In the storage device 11, the 2D or 3D map information and/or the vehicle control program may be stored. For example, the 3D map information may be configured by the point group data. The storage device 11 is configured to output the map information and the vehicle control program to the vehicle controller 3, in response to a request from the vehicle controller 3. The map information and the vehicle control program may be updated via the wireless communication unit 10 and the communication network such as the Internet.

When the vehicle 1 travels in an autonomous driving mode, the vehicle controller 3 autonomously generates at least one of a steering control signal, an accelerator control signal and a brake control signal, based on the traveling condition information, the surrounding environment information, the current position information, the map information and the like. The steering actuator 12 is configured to receive the steering control signal from the vehicle controller 3 and to control the steering device 13 on the basis of the received steering control signal. The brake actuator 14 is configured to receive the brake control signal from the vehicle controller 3 and to control the brake device 15 on the basis of the received brake control signal. The accelerator actuator 16 is configured to receive the accelerator control signal from the vehicle controller 3 and to control the accelerator device 17 on the basis of the received accelerator control signal. In this way, the vehicle controller 3 autonomously controls the traveling of the vehicle 1, based on the traveling condition information, the surrounding environment information, the current position information, the map information and the like. That is, in the autonomous driving mode, the traveling of the vehicle 1 is autonomously controlled by the vehicle system 2.

On the other hand, when the vehicle 1 travels in a manual driving mode, the vehicle controller 3 generates a steering control signal, an accelerator control signal and a brake control signal, in conformity with a driver's manual operation on the accelerator pedal, the brake pedal and the steering wheel. In this way, in the manual driving mode, the steering control signal, the accelerator control signal and the brake control signal are generated by the driver's manual operation, so that the traveling of the vehicle 1 is controlled by the driver.

Subsequently, the driving mode of the vehicle 1 is described. The driving mode includes an autonomous driving mode and a manual driving mode. The autonomous driving mode includes a fully autonomous driving mode, an advanced driving support mode, and a driving support mode. In the fully autonomous driving mode, the vehicle system 2 is configured to autonomously perform all of the traveling controls of the steering control, the brake control and the accelerator control, and the driver is not in a state where it is possible to drive the vehicle 1. In the advanced driving support mode, the vehicle system 2 is configured to autonomously perform all of the traveling controls of the steering control, the brake control and the accelerator control, and the driver does not drive the vehicle 1 although the driver is in a state where it is possible to drive the vehicle 1. In the driving support mode, the vehicle system 2 is configured to autonomously perform a part of the traveling controls of the steering control, the brake control and the accelerator control, and the driver drives the vehicle 1 under the driving support of the vehicle system 2. On the other hand, in the manual driving mode, the vehicle system 2 is configured not to autonomously perform the traveling controls, and the driver drives the vehicle 1 without the driving support of the vehicle system 2.

Also, the driving mode of the vehicle 1 may be switched by operating a driving mode changeover switch. In this case, the vehicle controller 3 is configured to switch the driving mode of the vehicle 1 among the four driving modes (the fully autonomous driving mode, the advanced driving support mode, the driving support mode, and the manual driving mode) in accordance with a driver's operation on the driving mode changeover switch. Also, the driving mode of the vehicle 1 may be autonomously switched on the basis of information relating to a travel-allowed section where traveling of an autonomous driving vehicle is allowed or a travel-prohibited section where the traveling of the autonomous driving vehicle is prohibited or information relating to the external weather condition. In this case, the vehicle controller 3 is configured to switch the driving mode of the vehicle 1, based on such information. Also, the driving mode of the vehicle 1 may be autonomously switched by using a seating sensor, a face direction sensor, or the like. In this case, the vehicle controller 3 is configured to switch the driving mode of the vehicle 1, based on an output signal from the seating sensor or the face direction sensor.

Figure 3:
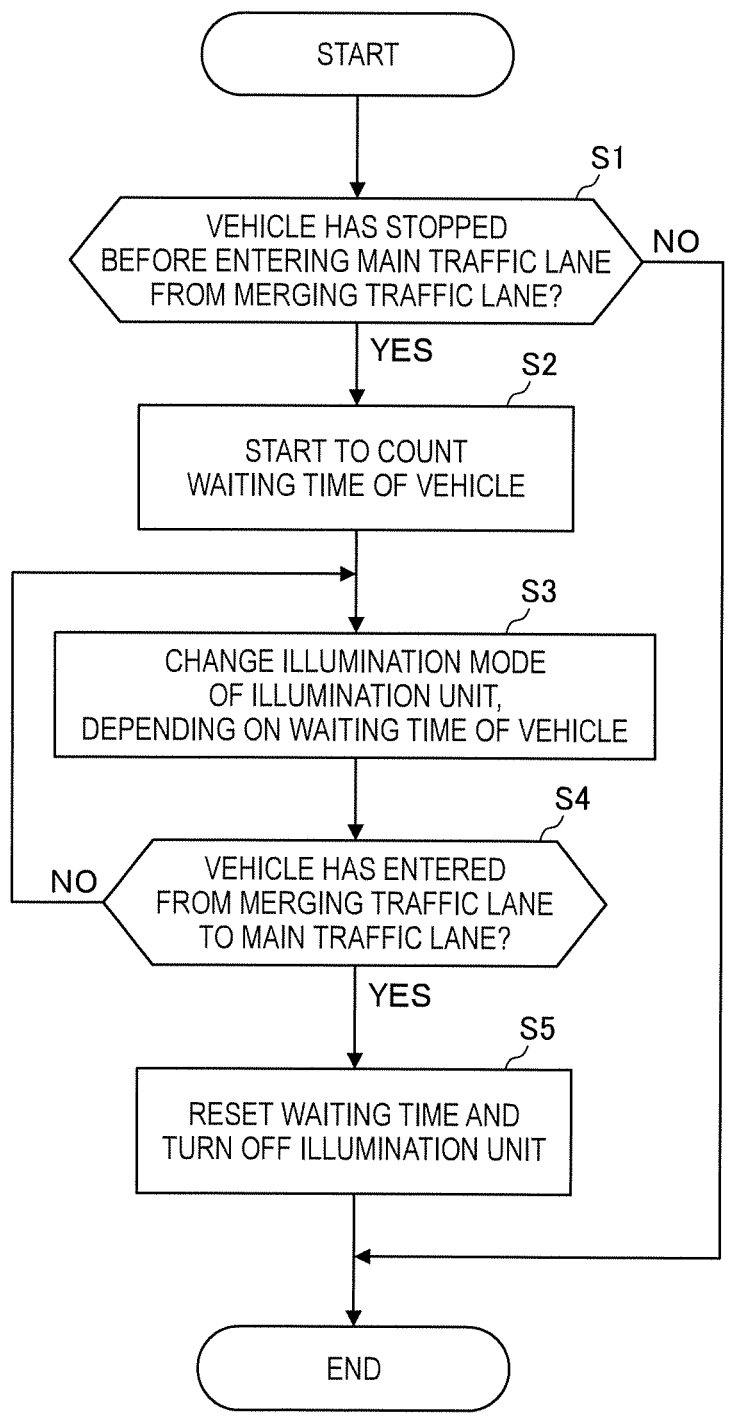
FIG. 3 is a flowchart depicting a first example of an operation flow of the vehicle illumination system of the illustrative embodiment.
Figure 4:
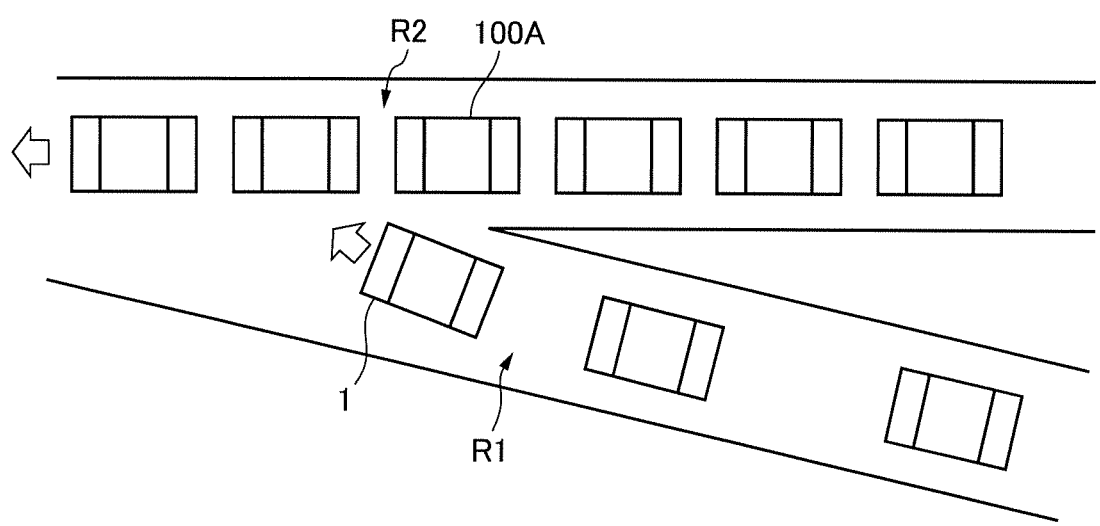
FIG. 4 depicts an aspect where a vehicle on a merging traffic lane intends to enter a main traffic lane.

Subsequently, a first example of an operation flow of the illumination system 4 in accordance with the illustrative embodiment is described with reference to FIGS. 3 and 4. In particular, in the first example, an operation flow of the illumination system 4 is described which is executed when the vehicle 1 traveling on a merging traffic lane R1 has stopped before entering a main traffic lane R2. FIG. 3 is a flowchart depicting the first example of the operation flow of the illumination system 4. FIG. 4 depicts an aspect where the vehicle 1 on the merging traffic lane R1 intends to enter the main traffic lane R2.

As shown in FIG. 3, in step S1, the illumination controller 47 determines whether the vehicle 1 has stopped before entering the main traffic lane R2 from the merging traffic lane R1. For example, when a signal, which indicates that the vehicle 1 has stopped before entering the main traffic lane R2 from the merging traffic lane R1, is received from the vehicle controller 3, the illumination controller 47 determines that the vehicle 1 has stopped before entering the main traffic lane R2. When a determination result in step S1 is YES, the processing proceeds to step S2. On the other hand, when the determination result in step S1 is NO, the processing is over. In the meantime, when the vehicle 1 is traveling in the advanced driving support mode or the fully autonomous driving mode, the vehicle controller 3 autonomously determines whether the vehicle 1 can enter the main traffic lane R2 from the merging traffic lane R1, based on detection data indicative of the surrounding environment of the vehicle 1 and acquired by the camera 6 and/or the radar 7. Thereafter, when it is determined that the vehicle 1 cannot enter the main traffic lane R2 due to the other vehicle existing on a future pathway of the vehicle 1, the vehicle controller 3 stops the vehicle 1 in the vicinity of a merging point of the merging traffic lane R1 and the main traffic lane R2.

Then, in step S2, the illumination controller 47 starts to count waiting time of the vehicle 1 after the vehicle 1 has stopped. In this respect, the illumination controller 47 may start to count the waiting time of the vehicle 1 immediately after the vehicle 1 has stopped or may start to count the waiting time of the vehicle 1 when predetermined time elapses after the vehicle 1 has stopped. Here, the waiting time of the vehicle 1 may mean time after the vehicle 1 has stopped ahead of the merging traffic lane R2 until the vehicle 1 cannot enter the main traffic lane R2 from the merging traffic lane R1. That is, the waiting time of the vehicle 1 may include not only time for which the vehicle 1 completely stops but also time for which the vehicle 1 slowly travels on the merging traffic lane R1. For this reason, even at the time when the stationary vehicle 1 starts to slowly travel on the merging traffic lane R1, the waiting time of the vehicle 1 may not be reset. In this case, when the vehicle 1 enters the main traffic lane R2 from the merging traffic lane R1, the waiting time of the vehicle 1 is reset.

Then, the illumination controller 47 changes an illumination mode (for example, an illumination color, the brightness, a blinking cycle, an illumination place and the like) of the illumination unit 44 (the left-side CSL 40L and the right-side CSL 40R), depending on the waiting time of the vehicle 1 (step S3). For example, the illumination controller 47 may change a blinking cycle of the illumination unit 44 (specifically, each of the light-emitting segments 43L, 43R), depending on the waiting time of the vehicle 1. In this respect, the illumination controller 47 may gradually shorten the blinking cycle of the illumination unit 44, depending on an increase in the waiting time of the vehicle 1. Also, the illumination controller 47 may change brightness (luminosity) of the illumination unit 44 (each of the light-emitting segments 43L, 43R), depending on the waiting time of the vehicle 1. In this respect, the illumination controller 47 may gradually increase the brightness of the illumination unit 44, depending on the increase in the waiting time of the vehicle 1. Also, the illumination controller 47 may change an illumination place of the illumination unit 44, depending on the waiting time of the vehicle 1. In this respect, the illumination controller 47 may gradually increase the number of the light-emitting segments to be turned on, depending on the increase in the waiting time of the vehicle 1.

Also, the illumination controller 47 may change an illumination color of the illumination unit 44 (specifically, each of the light-emitting segments 43L, 43R), depending on the waiting time of the vehicle 1. For example, when the waiting time of the vehicle 1 exceeds a first threshold Tth1, the illumination controller 47 may change the illumination color of the illumination unit 44 from white to yellow. Also, when the waiting time of the vehicle 1 exceeds a second threshold Tth2 (>Tth1), the illumination controller 47 may change the illumination color of the illumination unit 44 from yellow to red.

Then, in step S4, the illumination controller 47 determines whether the vehicle 1 has entered the main traffic lane R2 from the merging traffic lane R1. For example, when a signal, which indicates that the vehicle 1 has entered the main traffic lane R2 from the merging traffic lane R1, is received from the vehicle controller 3, the illumination controller 47 determines that the vehicle 1 has entered the main traffic lane R2 from the merging traffic lane R1. When a determination result in step S4 is YES, the processing proceeds to step S5. On the other hand, when the determination result in step S4 is NO, the processing of step S3 is again executed.

Then, in step S5, the illumination controller 47 resets the waiting time of the vehicle 1, and turns off the illumination unit 44. In this way, the series of operations of the illumination system 4 are executed.

According to the illustrative embodiment, the illumination mode of the illumination unit 44 is changed, depending on the waiting time of the vehicle 1. In this way, a driver of the other vehicle 100A (refer to FIG. 4) traveling on the main traffic lane R2 can presume a current situation of the vehicle 1 such as a fact that the vehicle 1 is waiting for predetermined time by visually recognizing the change in the illumination mode of the illumination unit 44 of the vehicle 1. For this reason, the other vehicle 100A is urged to wait so that the vehicle 1 can enter the main traffic lane R2. Therefore, it is possible to provide the illumination system 4 and the vehicle 1 capable of implementing rich visual communication between the vehicles.

Also, the illumination mode of the illumination unit 44 is changed, depending on the waiting time of the vehicle 1. Therefore, it is possible to present the emotion of the vehicle 1 (or the driver of the vehicle 1) toward the outside. In this way, it is possible to provide the illumination system 4 capable of expressing the emotion of the vehicle 1.

Also, according to the illustrative embodiment, the illumination unit 44 is turned off at a time when the vehicle 1 has moved from the merging traffic lane R1 to the main traffic lane R2. Therefore, the driver of the other vehicle 100A can recognize that the illumination mode of the illumination unit 44 has changed, depending on the waiting time of the vehicle 1.

In the meantime, in the illustrative embodiment, the illumination mode of the illumination unit 44 is changed, depending on the waiting time of the vehicle 1. However, the illustrative embodiment is not limited thereto. For example, the illumination mode of the illumination unit 44 may be changed, depending on stop time for which the vehicle 1 completely stops. In this case, when a speed of the vehicle 1 is not zero, the stop time of the vehicle 1 may be reset. In this way, it is possible to present the stop time of the vehicle 1 toward the outside of the vehicle 1 by changing the illumination mode of the illumination unit 44.

Figure 5:
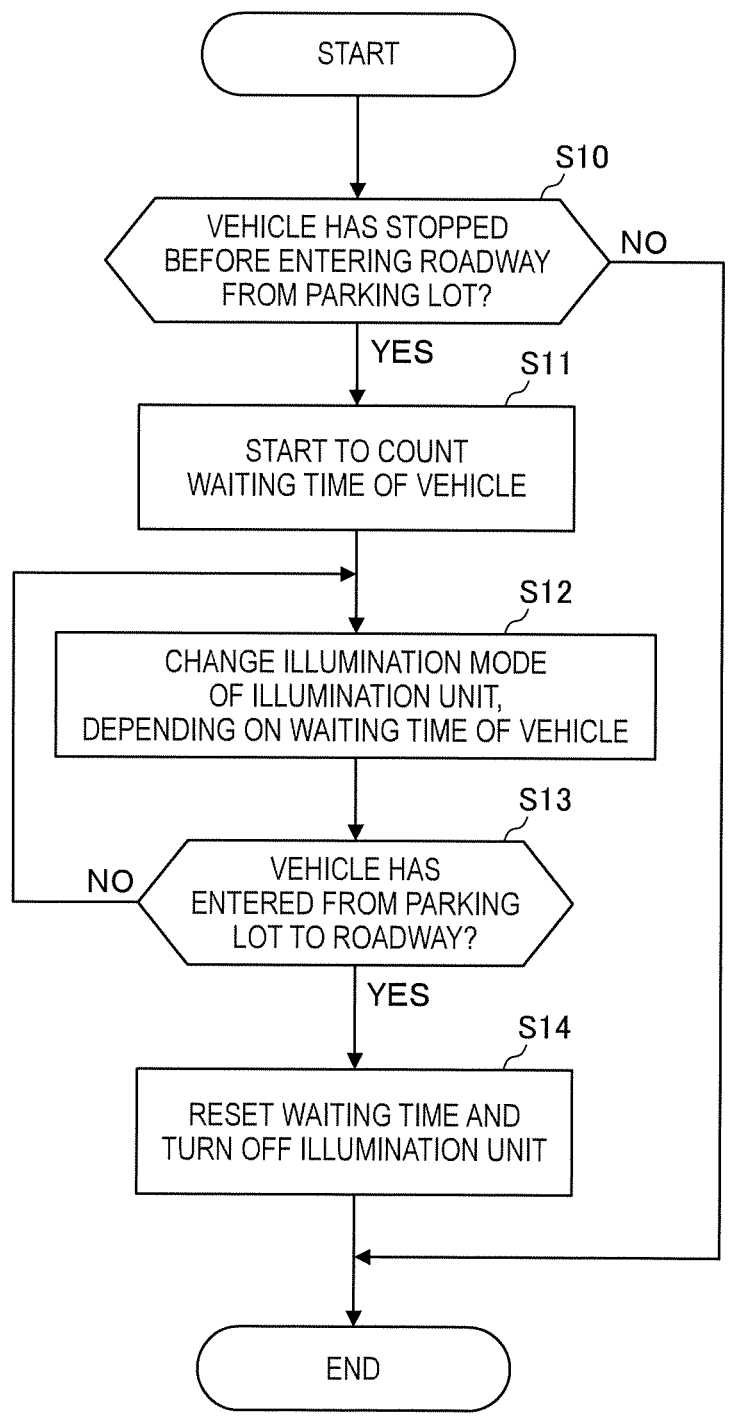
FIG. 5 is a flowchart depicting a second example of the operation flow of the vehicle illumination system of the illustrative embodiment.
Figure 6:
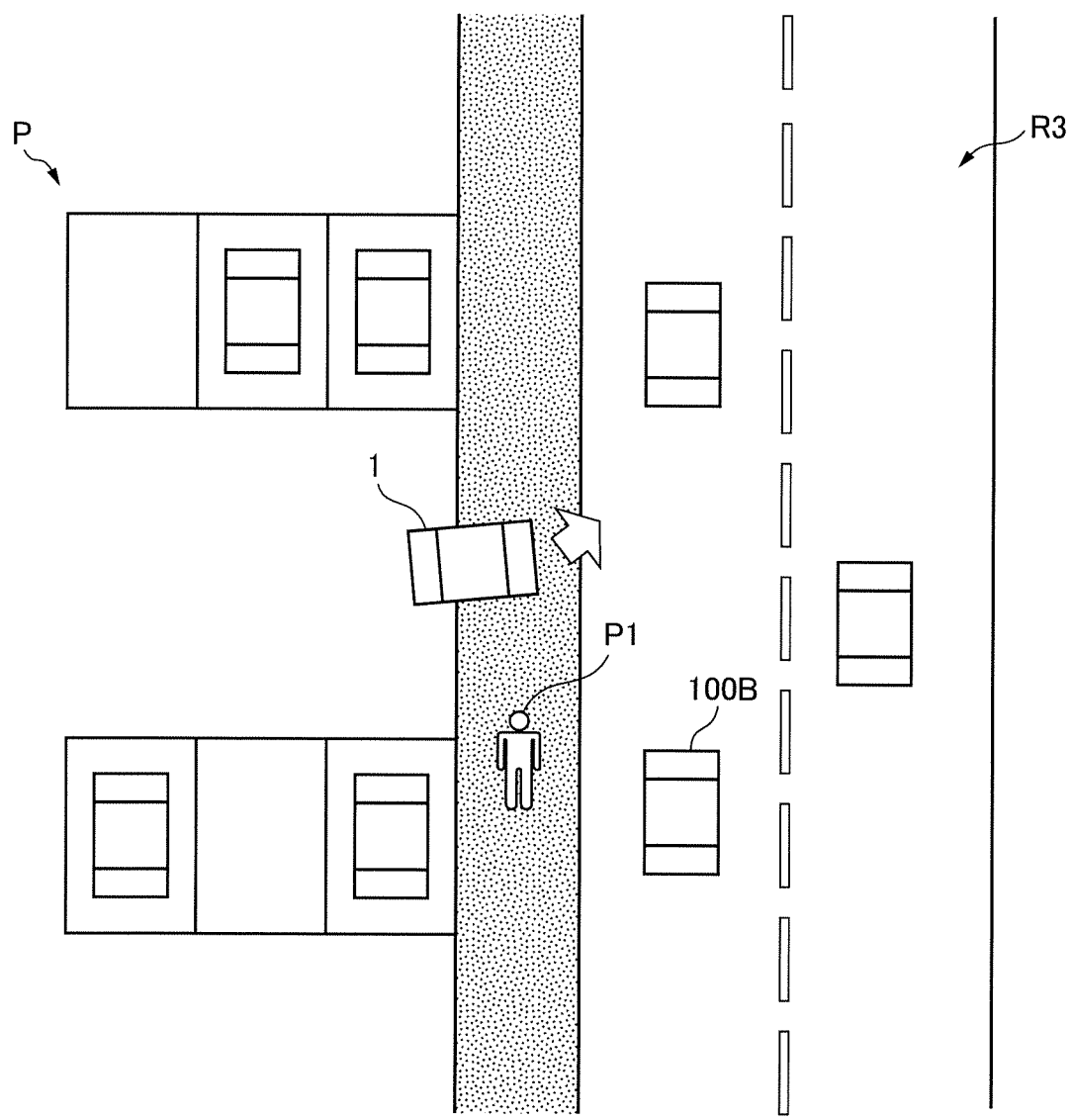
FIG. 6 depicts an aspect where the vehicle stops before entering a roadway from a parking lot.

Subsequently, a second example of the operation flow of the illumination system 4 in accordance with the illustrative embodiment is described with reference to FIGS. 5 and 6. In particular, in the second example, the operation flow of the illumination system 4 is described which is executed when the vehicle 1 in a parking lot P (an example of the predetermined site) has stopped before entering a roadway R3. FIG. 5 is a flowchart depicting the second example of the operation flow of the illumination system 4. FIG. 6 depicts an aspect where the vehicle 1 has stopped before entering the roadway R3 from the parking lot P.

As shown in FIG. 5, in step S10, the illumination controller 47 determines whether the vehicle 1 has stopped before entering the roadway R3 from the parking lot P. For example, when a signal, which indicates that the vehicle 1 has stopped before entering the roadway R3 from the parking lot P, is received from the vehicle controller 3, the illumination controller 47 determines that the vehicle 1 has stopped before entering the roadway R3. When a determination result in step S10 is YES, the processing proceeds to step S11. When the determination result in step S10 is NO, the processing is over. Then, in step S11, the illumination controller 47 starts to count the waiting time of the vehicle 1 after the vehicle 1 has stopped. Here, the waiting time of the vehicle 1 may mean time after the vehicle 1 has stopped ahead of the roadway R3 until the vehicle 1 cannot enter the roadway R3 from the parking lot P. In this case, when the vehicle 1 enters the roadway R3, the waiting time of the vehicle 1 is reset.

Then, the illumination controller 47 changes the illumination mode (for example, an illumination color, the brightness, a blinking cycle, an illumination place and the like) of the illumination unit 44 (the left-side CSL 40L and the right-side CSL 40R), depending on the waiting time of the vehicle 1 (step S12). Then, in step S13, the illumination controller 47 determines whether the vehicle 1 has entered the roadway R3 from the parking lot P. For example, when a signal, which indicates that the vehicle 1 has entered the roadway R3, is received from the vehicle controller 3, the illumination controller 47 determines that the vehicle 1 has entered the roadway R3. When a determination result in step S13 is YES, the processing proceeds to step S14. On the other hand, when the determination result in step S13 is NO, the processing of step S12 is again executed.

Then, in step S14, the illumination controller 47 resets the waiting time of the vehicle 1, and turns off the illumination unit 44. In this way, the series of operations of the illumination system 4 are executed.

According to the illustrative embodiment, the illumination mode of the illumination unit 44 is changed, depending on the waiting time of the vehicle 1. In this way, a driver of the other vehicle 100B (refer to FIG. 6) traveling on the roadway R3 can presume the current situation of the vehicle 1 such as a fact that the vehicle 1 is waiting for predetermined time by visually recognizing the change in the illumination mode of the illumination unit 44 of the vehicle 1. For this reason, the other vehicle 100B is urged to wait so that the vehicle 1 can enter the roadway R3. Therefore, it is possible to provide the illumination system 4 and the vehicle 1 capable of implementing rich visual communication between the vehicles.

Also, the illumination mode of the illumination unit 44 is changed, depending on the waiting time of the vehicle 1. Therefore, it is possible to present the emotion of the vehicle 1 (or the driver of the vehicle 1) to a pedestrian P1 and the other vehicle. In this way, it is possible to provide the illumination system 4 capable of expressing the emotion of the vehicle 1.

Also, according to the illustrative embodiment, the illumination unit 44 is turned off at a time when the vehicle 1 has entered the roadway R3 from the parking lot P. Therefore, the driver of the other vehicle 100B can recognize that the illumination mode of the illumination unit 44 has changed, depending on the waiting time of the vehicle 1.

Figure 7:
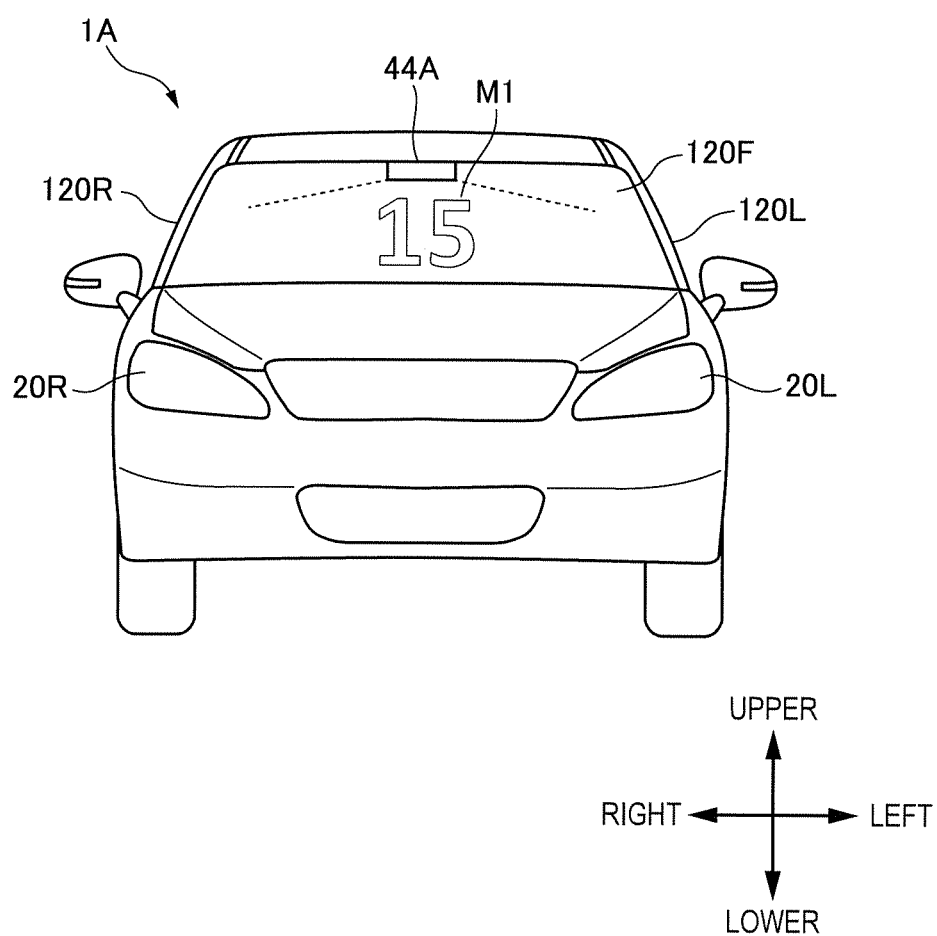
FIG. 7 is a front view of a vehicle having a vehicle illumination system in accordance with a modified embodiment of the illustrative embodiment.

Subsequently, an illumination unit 44A in accordance with a modified embodiment of the illustrative embodiment is described with reference to FIG. 7. FIG. 7 is a front view of a vehicle 1A having the illumination unit 44A mounted thereto. The vehicle 1A is different from the vehicle 1 of the illustrative embodiment, in that the illumination unit 44A is mounted instead of the illumination unit 44. In the below, the illumination unit 44A is described in detail.

As shown in FIG. 7, the illumination unit 44A is configured to visually present information M1 (hereinafter, waiting time information M1) relating to the waiting time of the vehicle 1A toward an outside of the vehicle 1A. In particular, the illumination unit 44A is configured to display the waiting time information M1 on a front glass 120F of the vehicle 1A. In this modified embodiment, the waiting time information M1 indicative the waiting time of 15 seconds is displayed on the front glass 120F.

The illumination unit 44A may be configured as a projector device configured to project the waiting time information M1 on the front glass 120F. Also, the illumination unit 44A may be configured to irradiate laser light on the front glass 120F, thereby directly drawing the waiting time information M1 on the front glass 120F. In this case, the front glass 120F of the vehicle 1A is a front glass for HUD (Head-Up Display), and may include two glass plates and a light-emitting layer provided between the two glass plates and made of a fluorescent material. Also, a laser light source of the illumination unit 44A may be configured to irradiate laser light in a short-wavelength region (for example, wavelength λ=350 nm to 410 nm). The laser light in the short-wavelength region is irradiated to the front glass 120F, so that the light-emitting layer of the front glass 120F emits the light and the waiting time information M1 is thus displayed on the front glass 120F. Also, the mounting position of the illumination unit 44A is not particularly limited inasmuch as the illumination unit 44A can display the waiting time information M1 on the front glass 120F.

In the meantime, the vehicle 1A may include a plurality of the illumination units 44A. In this case, one of the plurality of illumination units 44A may be configured to display the waiting time information M1 on a side glass 120L. Also, another one of the plurality of illumination units 44A may be configured to display the waiting time information M1 on a side glass 120R. Also, the illumination unit 44A may be configured to display the waiting time information M1 on a bonnet of the vehicle 1A, instead of the front glass 120F.

According to the modified embodiment, in the processing of step S3 in FIG. 3 or in the processing of step S12 in FIG. 5, the illumination controller 47 changes the waiting time information M1, which is to be presented by the illumination unit 44A, depending on the waiting time of the vehicle 1A. That is, the illumination unit 44A visually presents the waiting time information M1 indicative of the waiting time of the vehicle 1A toward the outside of the vehicle 1A. For example, when the waiting time of the vehicle 1A is 15 seconds, the illumination unit 44A visually presents the waiting time information M1 indicative of 15 seconds toward the outside. In this way, the driver in the other vehicle can securely perceive the waiting time of the vehicle 1A by visually recognizing the waiting time information M1 presented by the illumination unit 44A.

Although the illustrative embodiments of the present disclosure have been described, it goes without saying that the technical scope of the present disclosure should not be interpreted limitedly by the descriptions of the illustrative embodiments. It will be understood by one skilled in the art that the illustrative embodiments are just exemplary and that the illustrative embodiments can be diversely changed within the scope of the invention defined in the claims. The technical scope of the present disclosure should be determined on the basis of the scope of the invention defined in the claims and its equivalent scope.

In the illustrative embodiment, the illumination controller 47 changes the illumination mode of the illumination unit 44, depending on the waiting time of the vehicle 1. However, the illustrative embodiment is not limited thereto. For example, after the vehicle 1 stops ahead of the main traffic lane R2, the vehicle controller 3 may transmit a trigger signal, which indicates that the vehicle 1 has stopped ahead of the main traffic lane R2, to the infrastructure equipment existing at the outside the vehicle 1 via the wireless communication unit 10. The infrastructure equipment may be equipped in the vicinity of the merging point between the merging traffic lane R1 and the main traffic lane R2, for example. In this case, the infrastructure equipment may start to count the waiting time of the vehicle 1, depending on the received trigger signal. Then, the infrastructure equipment may change an illumination mode of an illumination unit of the infrastructure equipment, depending on the waiting time of the vehicle 1. In this way, the driver in the other vehicle outside the vehicle 1 can presume that the vehicle 1 is waiting by visually recognizing the change in the illumination mode of the illumination unit of the infrastructure equipment. In the meantime, as shown in FIG. 6, the infrastructure equipment may be equipped in the vicinity of an exit of the parking lot P.

Also, in the illustrative embodiment, the waiting time of the vehicle 1, which is counted when the vehicle 1 has stopped before entering the main traffic lane from the merging traffic lane, and the waiting time of the vehicle 1, which is counted when the vehicle 1 has stopped before entering the roadway from the parking lot, have been described. However, the waiting time of the vehicle 1 is not limited thereto. For example, the waiting time of the vehicle 1 may include following waiting times.

waiting time of the vehicle 1 that is counted when the vehicle 1 has stopped before turning right or left, waiting time of the vehicle 1 that is counted when the vehicle traveling on a narrow road has stopped before passing by an oncoming vehicle, and waiting time of the vehicle 1 that is counted when the vehicle 1 has stopped ahead of a crosswalk.

The illumination controller 47 may change the illumination mode of the illumination unit 44 (for example, an illumination color, an illumination intensity, a blinking cycle, an illumination place and the like), depending on the waiting time of the vehicle 1.

In the illustrative embodiments, the driving mode of the vehicle includes the fully autonomous driving mode, the advanced driving support mode, the driving support mode, and the manual driving mode. However, the driving mode of the vehicle should not be limited to the four modes. The classification of the driving mode of the vehicle may be appropriately changed, in accordance with laws or rules relating to the autonomous driving in each country. Likewise, the definitions of "the fully autonomous driving mode", "the advanced driving support mode" and "the driving support mode" described in the illustrative embodiments are just examples, and may be appropriately changed, in accordance with laws or rules relating to the autonomous driving in each country.

The embodiments are summarized as follows.

A vehicle illumination system related to one aspect of the present disclosure and provided to a vehicle capable of traveling in an autonomous driving mode includes: an illumination unit configured to emit light toward an outside of the vehicle; and an illumination controller configured to change an illumination mode of the illumination unit, depending on a waiting time of the vehicle.

According to the above configuration, the illumination mode of the illumination unit is changed, depending on the waiting time of the vehicle. In this way, a driver in the other vehicle outside the vehicle can presume a current situation of the vehicle such as a fact that the vehicle is waiting for predetermined time by visually recognizing the change in the illumination mode of the illumination unit. Therefore, it is possible to provide the vehicle illumination system capable of implementing rich visual communication between the vehicles.

Moreover, when the vehicle has stopped before entering a main traffic lane from a merging traffic lane, the illumination controller may change the illumination mode of the illumination unit, depending on the waiting time of the vehicle.

According to the above configuration, when the vehicle has stopped before entering the main traffic lane from the merging traffic lane, the illumination mode of the illumination unit is changed, depending on the waiting time of the vehicle. In this way, the driver in the other vehicle outside the vehicle can presume the current situation of the vehicle such as a fact that the vehicle cannot enter the main traffic lane from the merging traffic lane for predetermined time by visually recognizing the change in the illumination mode of the illumination unit. For this reason, the other vehicle is urged to wait so that the vehicle can enter the main traffic lane. Therefore, it is possible to implement the rich visual communication between the vehicles.

Moreover, when the vehicle has stopped before entering a roadway from a predetermined site, the illumination controller may change the illumination mode of the illumination unit, depending on the waiting time of the vehicle.

According to the above configuration, when the vehicle has stopped before entering the roadway from the predetermined site (for example, a parking lot and the like), the illumination mode of the illumination unit is changed, depending on the waiting time of the vehicle. In this way, the driver in the other vehicle outside the vehicle can presume the current situation of the vehicle such as a fact that the vehicle cannot enter the roadway from the predetermined site for predetermined time by visually recognizing the change in the illumination mode of the illumination unit. For this reason, the other vehicle is urged to wait so that the vehicle can enter the roadway. Therefore, it is possible to implement the rich visual communication between the vehicles.

Moreover, when the vehicle has moved from the merging traffic lane to the main traffic lane, the illumination controller may turn off the illumination unit.

According to the above configuration, the illumination unit is turned off at a time when the vehicle can move from the merging traffic lane to the main traffic lane. Therefore, the driver in the other vehicle can recognize that the illumination mode of the illumination unit has changed, depending on the waiting time of the vehicle.

Moreover, when the vehicle has entered from the predetermined site to the roadway, the illumination controller may turn off the illumination unit.

According to the above configuration, the illumination unit is turned off at a time when the vehicle has moved from the predetermined site to the roadway. Therefore, the driver in the other vehicle can recognize that the illumination mode of the illumination unit has changed, depending on the waiting time of the vehicle.

Moreover, the illumination unit may be configured to visually present information about the waiting time of the vehicle.

According to the above configuration, the driver in the other vehicle outside the vehicle can perceive the waiting time of the vehicle by visually recognizing the information about the waiting time of the vehicle.

A vehicle including the above-mentioned vehicle illumination system, which is capable of traveling in an autonomous driving mode, is provided.

According to the above configuration, it is possible to provide the vehicle capable of implementing rich visual communication between the vehicles.

According to the present disclosure, it is possible to provide the vehicle illumination system and the vehicle capable of implementing rich visual communication between the vehicles.

The invention claimed is:

1. A vehicle illumination system provided to a vehicle capable of traveling in an autonomous driving mode, the vehicle illumination system comprising:

an illumination unit configured to emit light toward an outside of the vehicle; and an illumination controller configured to change an illumination mode of the illumination unit, depending on a waiting time of the vehicle, wherein when the vehicle has stopped before entering a main traffic lane from a merging traffic lane, the illumination controller changes the illumination mode of the illumination unit, depending on the waiting time of the vehicle, and wherein when the vehicle has moved from the merging traffic lane to the main traffic lane, the illumination controller turns off the illumination unit.

2. The vehicle illumination system according to claim 1, wherein when the vehicle has stopped before entering a roadway from a predetermined site, the illumination controller changes the illumination mode of the illumination unit, depending on the waiting time of the vehicle.

3. The vehicle illumination system according to claim 2, wherein when the vehicle has entered from the predetermined site to the roadway, the illumination controller turns off the illumination unit.

4. The vehicle illumination system according to claim 1, wherein the illumination unit is configured to visually present information about the waiting time of the vehicle.

5. A vehicle comprising a vehicle illumination system and capable of traveling in an autonomous driving mode, the vehicle illumination system comprising:

an illumination unit configured to emit light toward an outside of the vehicle; and an illumination controller configured to change an illumination mode of the illumination unit, depending on a waiting time of the vehicle, wherein when the vehicle has stopped before entering a main traffic lane from a merging traffic lane, the illumination controller changes the illumination mode of the illumination unit, depending on the waiting time of the vehicle, and wherein when the vehicle has moved from the merging traffic lane to the main traffic lane, the illumination controller turns off the illumination unit.

6. A vehicle illumination system provided to a vehicle capable of traveling in an autonomous driving mode, the vehicle illumination system comprising:

an illumination unit configured to emit light toward an outside of the vehicle; and an illumination controller configured to change an illumination mode of the illumination unit, depending on a waiting time of the vehicle, wherein when the vehicle has stopped before entering a roadway from a predetermined site, the illumination controller changes the illumination mode of the illumination unit, depending on the waiting time of the vehicle, and wherein when the vehicle has entered from the predetermined site to the roadway, the illumination controller turns off the illumination unit.

* * * * *